United States Patent [19]

Biondetti

[11] 4,381,588
[45] May 3, 1983

[54] CONTROLLED DEFLECTION ROLL

[75] Inventor: Mario Biondetti, Schio, Italy

[73] Assignee: Escher Wyss Limited, Zurich, Switzerland

[21] Appl. No.: 226,206

[22] Filed: Jan. 19, 1981

[30] Foreign Application Priority Data

Feb. 27, 1980 [CH] Switzerland ................. 1565/80

[51] Int. Cl.³ .............................................. B21B 27/02
[52] U.S. Cl. ............................................. 29/116 AD
[58] Field of Search ......... 29/113 R, 113 AD, 116 R, 29/116 AD

[56] References Cited

U.S. PATENT DOCUMENTS 4,030,415 6/1977 Fellows ...................... 29/113 R X
4,035,038 7/1977 Hinchcliffe et al. ......... 29/116 R X
4,233,011 11/1980 Bolender et al. ......... 29/116 AD X Primary Examiner—Eugene F. Desmond
Attorney, Agent, or Firm—Werner W. Kleeman

[57] ABSTRACT

A controlled deflection roll contains a stationary roll support and a roll shell which is rotatable about the stationary roll support. The roll shell consists of two parts or elements which are coaxially interconnected by friction, and specifically, an inner base body and an outer sleeve. The outer surface of the base body and the inner surface of the sleeve can contain substantially cylindrical stepped surfaces facilitating the mounting or insertion of the sleeve upon the base body and the withdrawal of the sleeve from the base body with the aid of a pressurized fluid medium.

10 Claims, 7 Drawing Figures

CONTROLLED DEFLECTION ROLL

BACKGROUND OF THE INVENTION

The present invention relates to a new and improved construction of a controlled deflection roll.

Generally speaking, the controlled deflection roll of the present invention is of the type comprising a stationary roll support and a roll shell rotatable about the stationary roll support. The roll shell is supported upon the roll support by means of at least one support or pressure element which acts upon the inner surface of the roll shell by exerting a pressure force.

In controlled deflection rolls of this type, for instance as have become known in this technology from U.S. Pat. No. 3,802,044, granted Apr. 9, 1974, there are employed either metallic shells or jackets, usually formed of cast iron, or soft shells formed of rubber or a rubber-like plastics material. These roll shells were fabricated in their entirety from the relevant material.

However, under certain circumstances it is readily possible for quite different requirements to be placed upon the inner surface and the outer surface of the roll shell. Thus, the inner surface must possess certain running properties for its coaction with the support or pressure elements, whereas the outer surface is intended to act upon a material which is to be processed and, as a rule, should be compressed, and thus, in may instances the outer surface of the roll shell should have quite different properties than the inner surface of such roll shell. Additionally, this outer surface frequently is subjected to considerable wear. If the outer surface of the roll shell becomes worn then with the prior art constructions of controlled deflection rolls the entire roll shell must be exchanged. This work is complicated, time-consuming and expensive.

SUMMARY OF THE INVENTION

Therefore, with the foregoing in mind it is a primary object of the present invention to provide a new and improved construction of a controlled deflection roll which is not associated with the aforementioned drawbacks and limitations of the state-of-the-art constructions discussed above.

Another and more specific object of the present invention aims at providing a new and improved construction of a controlled deflection roll wherein it is not only possible for the inner surface and the outer surface of the roll shell to consist of different materials, but additionally there is rendered possible a simpler and more rapid exchange of the outer surface of the roll shell which is exposed to wear phenomenon.

Still a further significant object of the present invention aims at providing a new and improved construction of a controlled deflection roll which is relatively simple in design, economical to manufacture, extremely reliable in operation, not readily subject to breakdown or malfunction, and wherein it is possible to provide different properties for the outer and inner surfaces of the roll shell and to exchange in a most simple and efficacious manner the part of the controlled deflection roll constituting the outer surface when such becomes worn.

Now in order to implement these and still further objects, which will become more readily apparent as the description proceeds, the controlled deflection roll of the present development is manifested by the features that the roll shell contains at least two parts or elements which are coaxially releasably interconnected with one another, and specifically, consists of an inner base body and an outer sleeve or jacket.

The sleeve or jacket can be preferably attached to the base body by friction. Such simple connection technique renders possible a particularly simple and easy exchange of the sleeve or sleeve member.

The base body can be formed of a material having a greater modulus of elasticity than that of the sleeve member. In such case the base body is more rigid and tends to deform less upon mounting of the sleeve member.

Moreover, at least the base body of the roll shell can be formed of metal. The sleeve member, in this case, can be formed of a soft material, such as by way of example and not limitation, rubber or plastic materials, but equally could be formed of metal.

The base body can possess at least one essentially cylindrical outer surface and the sleeve member can contain an opening having an appropriate inner surface. The diameter of the outer surface of the base body is greater by a predetermined overdimension than the diameter of the inner surface of the opening of the sleeve member which coacts with such outer surface of the base body. Due to this overdimensioning there prevails the previously mentioned friction between the base body and the sleeve member, ensuring for adequate adherence of the sleeve member at the base body during operation of the controlled deflection roll.

Furthermore, at least one end of the base body and at least one end of the sleeve member can be provided with sealing means. One of these roll shell parts or elements, either the base body or the sleeve member, is advantageously provided with a channel which leads behind the related sealing means and at which merges the surface intended to coact with the other shell part or element. This channel can be connected with a source of a suitable pressurised fluid medium. Due to these measures it is possible to facilitate the attachment of the sleeve member at the base body and also its removal therefrom, since it is sufficient to insert a part of the sleeve member onto the base body and thereafter to infeed the pressurised fluid medium, such as for instance a gas, typically air, or a liquid such as water or oil, between the base body and the sleeve member. As a result, the sleeve member is expanded and the base body is compressed together, so that the insertion of the sleeve member upon the base body or the withdrawal of the sleeve member from the base body is markedly facilitated. This simple construction is particularly suitable when working with soft roll shells, for instance formed of plastics material or rubber.

According to a particularly advantageous design the base body can comprise an outer surface containing at least two cylindrical portions or sections having stepped diameters and the inner opening of the sleeve member can be provided with at least two appropriate cylindrical sections or portions having stepped diameters. In the non-deformed condition the outer diameter of one section or portion of the base body is larger by a certain excess size or overdimension than the inner diameter of the corresponding section or portion of the opening of the sleeve member, but the diameter of one section of the sleeve member having a larger diameter of the opening of such sleeve member is larger than the diameter of a neighbouring section of the outer surface of the base body containing the smaller diameter. The base body is provided at its end containing the smaller diameter with sealing means and the sleeve member is provided with sealing means at the end of its opening containing the larger diameter. The base body is provided with a channel which leads behind the related sealing means and is connectable with a source of a pressurised fluid medium. This construction allows for a particularly simple mounting and withdrawal of the sleeve member from the roll shell and for such reason also is suitable for use in difficult situations, for instance for metallic roll shells.

Preferably, the base body of the roll shell can be supported at the roll support upon at least one support or pressure element which can be activated by a hydraulic pressurised fluid medium. Such support elements are known, for instance, by way of example from the previously mentioned U.S. Pat. No. 3,802,044, granted Apr. 9, 1974. However, it is to be specifically understood that random other constructions of support or pressure elements can be used in conjunction with the invention.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
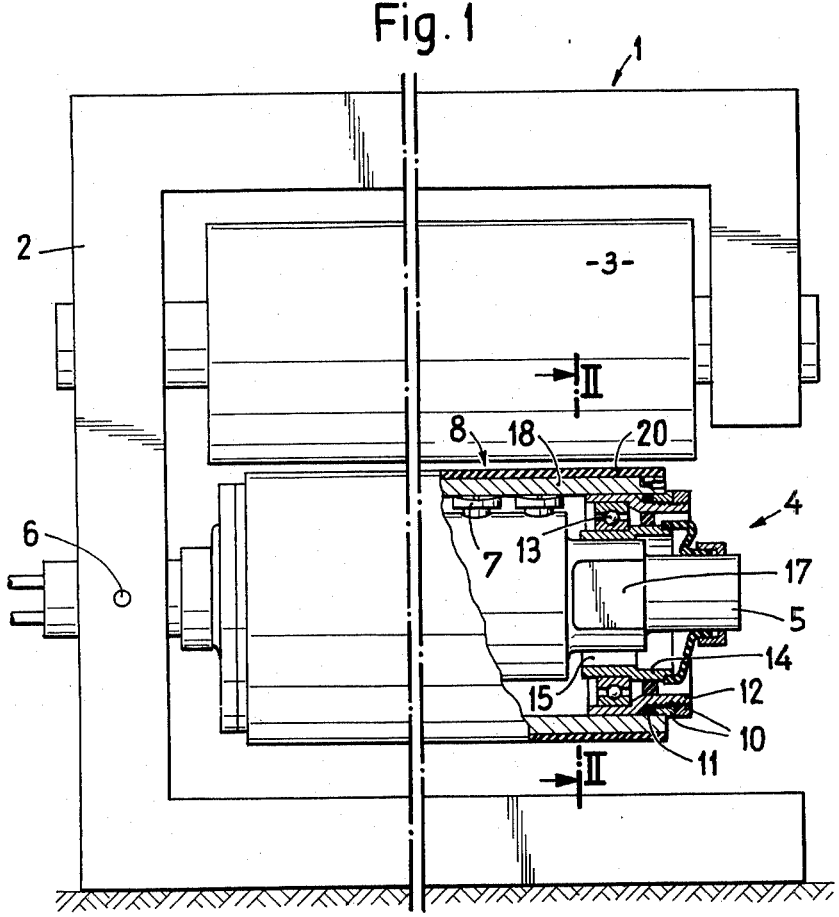
FIG. 1 schematically illustrates a rolling mill or device with which the controlled deflection roll of the invention is employed.

Describing now the drawings, in FIG. 1 there has been schematically illustrated a rolling mill or device 1 containing a frame or frame arrangement 2 in which there is rotatably mounted an upper or top roll 3 which, for instance, can be provided with any suitable and therefore not particularly illustrated drive. Coacting with the top or upper roll 3 and serving as a lower roll is a controlled deflection roll 4 which is designed according to the teachings of the invention. This controlled deflection roll 4—sometimes also referred to in the art as a roll with bending or sag compensation—comprises a stationary roll support 5. This stationary roll support 5 is attached in the frame 2, and it is secured against rotation in the frame 2 by the schematically illustrated pins 6 or equivalent structure. Guided in the roll support 5 are piston-like hydrostatic pressure or support elements 7 which, in the embodiment under discussion, can be designed, by way of example and not limitation, in accordance with the teachings of the aforementioned U.S. Pat. No. 3,802,044, granted Apr. 9, 1974. Upon the support or pressure elements 7 there is supported a roll shell 8 which is rotatable about the stationary roll support 5.

Attached in the roll shell 8 with the aid of two threaded rings 10 and a clamping ring 11 is an outer bushing 12 within which there is located a ball bearing 13 or any other suitable anti-friction bearing means. The not particularly referenced inner ring or race of the ball bearing 13 is arranged, in turn, at an inner bushing 14 which, according to the illustration of FIG. 2, has an elongate opening 15 containing two lateral guide surfaces 16. These guide surfaces 16 of the bushing 14 are guided along flat or planar guide surfaces 17 of the roll support 5. Such construction of controlled deflection roll, enabling the performance of displacement or elevational movements for pressing against a counter roll without using an external contact or pressure exerting mechanism, is known in this technology from U.S. Pat. No. 3,885,283, granted May 27, 1975.

Figure 2:
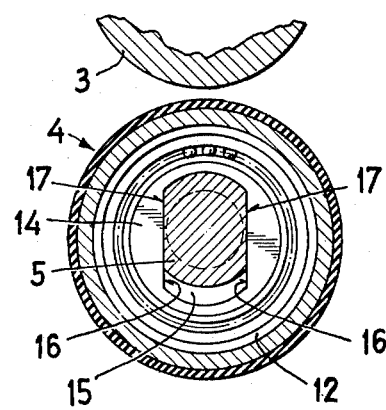
FIG. 2 is a fragmentary sectional view of the arrangement of FIG. 1, taken substantially along the lines II—II thereof.

As will be further recognised by reverting to FIGS. 1 and 2, the roll shell 8 of the controlled deflection roll 4 consists of an inner base body 18 and an outer sleeve or sleeve member 20 which can be easily releasably connected with the base body 18.

Figure 3:
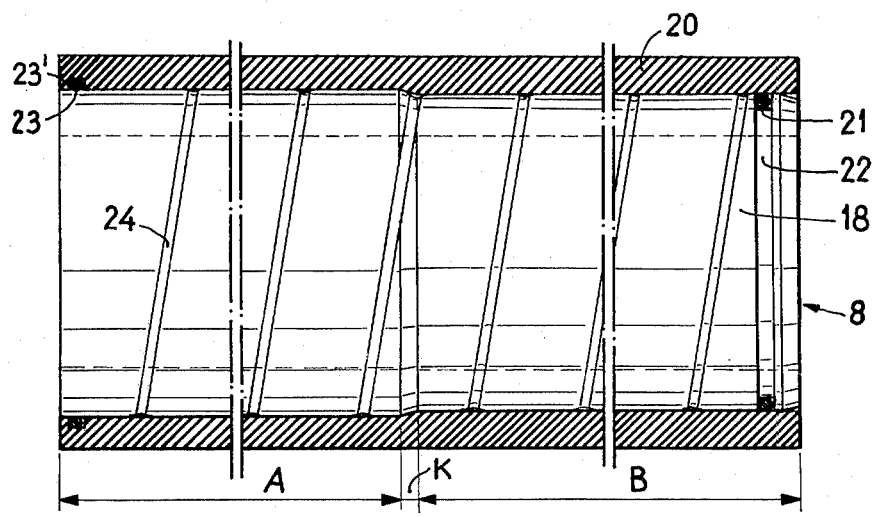
FIG. 3 is a fragmentary sectional view of the roll shell of the lower roll shown in FIG. 2, wherein the inner base body is shown in front view and the outer sleeve member is shown in sectional view.

In the showing of FIG. 3 the roll shell 8 of the controlled deflection roll 4 has been illustrated on an enlarged scale, and the base body 18 has been shown in front view and the sleeve member 20 in sectional view. As will be seen by referring to FIG. 3, the base body 18 and the sleeve member or sleeve 20 contain essentially two cylindrical portions or sections A and B between which there is located a conical transition region or simply transition K. The diameter of the cylindrical surfaces at the section A is larger than the diameter at the section or portion B. The exact ratio of the diameter of the base body 18 and the sleeve member 20 at both sections or portions A and B will be explained more fully hereinafter in conjunction with the description of FIGS. 6 and 7.

As also will be seen by again referring to FIG. 3, at the right-hand end of the section B containing the smaller diameter of the base body 18 there is located a sealing ring 21 which is arranged within a suitably configured groove 22. In the same manner there is located at the section or portion A, having the larger diameter, in the sleeve member 20, a sealing ring 23 which likewise is mounted in a suitable groove 23'. Both of the sealing rings 21 and 23 serve for sealing the intermediate space between the base body 18 and the sleeve member 20 during mounting or removal, as the case may be, of such sleeve member 20 upon or from the base body 18.

Figure 5:
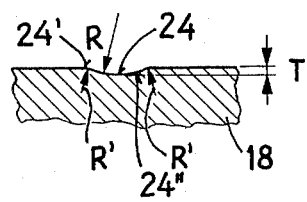
FIG. 5 is a fragmentary sectional view of the right-hand end of the base body shown in FIG. 4 and illustrating a groove which is formed in its outer surface.

Finally, the surface of the base body 18 is also provided with a helical-shaped flat groove 24, the profile or sectional shape of which will be apparent by referring to FIG. 5. This groove 24, in accordance with the illustration of FIG. 3, terminates in each case shortly before the related sealing ring.

According to the showing of FIG. 5 the groove 24 has a central portion, the cross-section of which is limited by a radius R. The edges 24' at both sides of the groove 24 are rounded by smaller radii R'. The depth of the groove 24 has been designated by reference character T in FIG. 5. According to a particular design the groove 24 can have a radius R equal to 20 millimetres, the smaller radii R' then in each case would amount to 5 millimeters, with a depth T of about 0.7 millimeters.

Based upon the showing of FIGS. 6 and 7 there will be explained the ratio of the diameters of the cylindrical surfaces of the base body 18 and the sleeve member 20 in the undeformed condition. As best seen by referring to FIG. 6 the sleeve member 20 at the section or portion A possesses a cylindrical inner surface 30 having a diameter $D_1'$ and at the section B a cylindrical inner surface 31 having a diameter $D_2'$.

Figure 7:
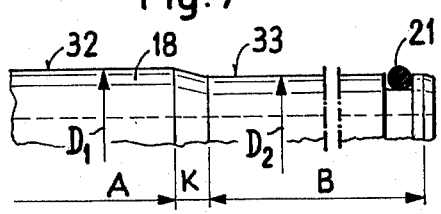

According to the showing of FIG. 7 the base body 18 possesses at the section or portion A a cylindrical outer surface 32 having a diameter $D_1$ and at the section or portion B a cylindrical outer surface 33 having a diameter $D_2$.

In order to render possible attachment of the sleeve member 20 at the base body 18 by friction, the surfaces 30 and 32 and 31 and 33, respectively, bear upon one another with a certain pre-biased force. This is obtained in that in each instance the diameters $D_1$ and $D_2$ of the base body 18 are greater by a certain overdimension than the diameters $D_1'$ and $D_2'$ of the sleeve member 20. This overdimension is determined in known manner as a function of the respective modulus of the elasticity of the materials of the base body 18 and the sleeve member 20 as well as the desired pre-biased force.

Moreover, additionally the mutual graduation of the diameters $D_1$ and $D_2$ and $D_1'$ and $D_2'$, respectively, is chosen such that the diameter $D_1'$ of the sleeve member 20 is greater than the smaller diameter $D_2'$ of the base body 18. However, it is smaller by only such an amount that the sealing ring 23 is capable of sealing the intermediate space.

Figure 4:
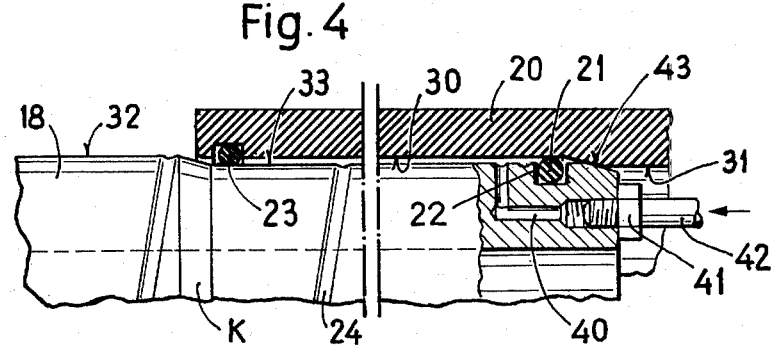
FIG. 4 is a partial sectional view on an enlarged scale in relation to FIG. 3 and serving to explain the procedures performed during mounting or insertion of the sleeve member upon the base body.

The operations which are performed when mounting the sleeve member 20 upon the base body 18 have been illustrated in FIG. 4, in which there is also shown a channel 40 with which there can be connected a nipple or stud 41 of a conduit or line 42. This conduit or line 42 is connectable with any suitable source of pressurised fluid medium, for instance compressed air, pressurised water or pressurised oil.

Figure 6:
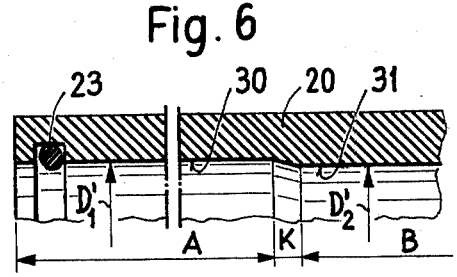
FIGS. 6 and 7 respectively show fragmentary sectional views of the sleeve member and the base body, there also being illustrated the diameter of their coacting surfaces in the non-deformed condition of such components.

During the insertion or mounting of the sleeve member 20 upon the base body 18, and as will be apparent from what has been described in conjunction with FIGS. 6 and 7, the section or portion A of the sleeve member 20 with the surface 30 can be easily drawn over the section or portion B with the surface 33 of the base body 18, and specifically, essentially up to the region of the conical intermediate portion K of the base body 18. Thereafter, there can be introduced into the intermediate space between the surfaces 30 and 33 the aforementioned pressurised fluid medium through the channel 40. If the jackets are formed of a plastics material or rubber then the pressurized fluid medium either can be air or pressurised water. When working with metallic components it is more readily contemplated to use pressurised oil.

Due to the pressurised fluid medium which is effective in the intermediate space between the surfaces 30 and 33 the sleeve member 20 is expanded, and the base body 18 also is somewhat compressed together. Thereafter the sleeve member 20 can be displaced, in the showing of FIG. 4, towards the left upon the surface 32 and up to its end region. By removing the nipple 41 out of the channel 40 the pressurised fluid medium can vent, so that the surfaces 30 and 32 and 31 and 33, respectively, can come to bear free of play against one another, and between them there is effective the desired frictional force which is governed by the overdimensioning of the diameter of the base body. Upon removing the sleeve member 20 from the base body 18 it is possible to introduce in the same manner through the channel 40 the pressurised fluid medium between the mutually bearing surfaces 30, 31, 32 and 33 of the sleeve member 20 and the base body 18, respectively. Consequently, these are raised from one another so that the sleeve member 20 can easily be brought into the position of FIG. 4 and thereafter withdrawn.

The groove 24 facilitates the infeed of the pressurised fluid medium between the mutually contacting surfaces and, in particular, also its outflow following the attachment of the sleeve member 20 in its position. Since the groove 24 is quite flat and has markedly rounded corners or edges (radii R') it does not hinder the sealing action of the sealing ring 23 which is guided over the individual coils of the groove 24 during its movement towards the left of FIG. 4.

In the drawings, especially FIGS. 3 to 7, there has been illustrated a preferred embodiment of the invention. It should be understood that modifications of the illustrated construction of controlled deflection roll are conceivable and well within the framework and teachings of the present invention. Thus, for instance, instead of both portions A and B it would be possible to provide three stepped portions or sections, at which there prevails the same conditions or relationships as for the sections or portions A and B.

Also it would be conceivable to construct in radial direction the jacket from more than two parts or elements, namely the base body 18 and the sleeve member 20. Thus, for instance, there could be inserted upon the sleeve member 20 a second sleeve member in the same manner.

On the other hand, when working with extremely soft sleeves or sleeve members 20, for instance formed of rubber, it is conceivable to construct a simplified modification in which the base body as well as also the sleeve member in each case only have one cylindrical surface, i.e. the stepping or graduation of the diameter is dispensed with. It is specifically possible when working with very soft sleeve members 20 to displace the sleeve member over a portion of the end of the base body 18 according to FIG. 4 by simply elastically expanding the same, whereafter the enlargement simply can be accomplished by introducing the pressurised fluid medium. In such case it is possible under circumstances, for their to be even dispensed with the use of the sealing rings 21 and 23. The sealing ring or seal means 23 can be replaced, for instance, by a small bead which approximately has the external configuration of the sealing ring 23. At the location of the sealing ring 21 the sealing action can be replaced by an inclined slide surface 43 which also affords good operational advantages with the embodiment of FIGS. 3 to 7.

In FIG. 1 the inventive controlled deflection roll 4 has been shown provided with a cantilever support or carrier 5, i.e. a support 5 which is only rigidly secured at one end. As will be seen from the illustration of FIG. 1, with this embodiment there is rendered possible a paticularly easy exchange of the sleeve member 20, since it simply can be withdrawn in the described manner to the right of the showing of FIG. 1 and, on the other hand, can again be mounted from the right towards the left in the illustration of FIG. 1. This embodiment is particularly suitable for those instances where there is needed a more frequent exchange of the sleeve member, such as, for example, in the case of rotary printing presses and so forth. However, it should be understood that the inventive controlled deflection roll also can be designed so as to have a support which is mounted at both ends, for instance as disclosed in the aforementioned U.S. Pat. No. 3,802,044, granted Apr. 9, 1974 and U.S. Pat. No. 3,885,283, granted May 27, 1975. In such case it is however necessary during an intentional exchange of the sleeve member to at least dismantle the roll from the frame arrangement or it is even necessary to remove the shell from the roll.

It also should be understood that the aforementioned essentially cylindrical surfaces equally could have a slightly conical configuration. As a result the operations carried out during insertion of the sleeve member upon the base body are facilitated. In the case of sleeve members formed of rubber or plastics material it is thus also possible to simplify their fabrication, since they can be more easily withdrawn from the inserted bushings upon which they are, for instance, vulcanised or during grinding of their surfaces have been mounted thereon. This is particularly the case for sleeve members whose opening is not graduated or stepped in the described manner as well as for the related base body.

While there are shown and described present preferred embodiment of the invention, it is to be distinctly understood that the invention is not limited thereto, but may be otherwise variously embodied and practiced within the scope of the following claims.

Accordingly, what I claim is:

1. A controlled deflection roll comprising:
    a stationary roll support;
    a roll shell mounted to be rotatable about the stationary roll support;
    said roll shell having an inner surface;
    at least one support element for supporting the roll shell upon the stationary roll support;
    said support element acting with a pressure force against the inner surface of the roll shell;
    said roll shell comprising at least two coaxial elements which can be releasably interconnected with one another;
    said at least two coaxial releasably interconnectable elements comprising an inner base body and an outer sleeve member;
    respective sealing means provided for at least one end of the base body and at least one end of the sleeve member;
    said base body of the roll shell being provided with a channel;
    said channel opening into an outer surface of the base body which coacts with an inner surface of the sleeve member of the roll shell;
    a source of a pressurized fluid medium connectable with said channel;
    said outer surface of the base body containing at least two cylindrical portions having stepped diameters;
    said inner surface of the sleeve member being provided with at least two correspondingly configured cylindrical portions possessing stepped diameters and cooperating with related ones of said two cylindrical portions of the base body;
    in the undeformed condition of the interconnectable elements of the roll shell the outer diameter of each cylindrical portion of the base body is larger in size by a given overdimension than the inner diameter of each related cylindrical portion of the sleeve member, but the diameter of one portion of the sleeve member containing the larger diameter of such sleeve member being greater than the diameter of a neighboring portion of the base body containing the smaller diameter of the outer surface of such base body;
    said sealing means being provided for the base body at its end having the smaller diameter and at the sleeve member at its end having the larger diameter; and
    said channel extending behind the related sealing means at said base body.

2. The controlled deflection roll as defined in claim 1, wherein
    said sleeve member is secured to said base body by friction.

3. The controlled deflection roll as defined in claim 2, wherein:
    said base body is formed of a material having a greater modulus of elasticity than the modulus of elasticity of the sleeve member.

4. The controlled deflection roll as defined in claim 1, wherein:
    said base body is formed of a meterial having a greater modulus of elasticity than the modulus of elasticity of said sleeve member.

5. The controlled deflection roll as defined in claim 1, wherein:
    at least said base body of said roll shell is formed of metal.

6. The controlled deflection roll as defined in claim 2, wherein:
    at least said sleeve member of said roll shell is formed of an elastomeric material.

7. The controlled deflection roll as defined in claim 1, further including:
    a hydraulic pressurised fluid medium for activating said at least one support element for supporting the roll shell upon said stationary roll support.

8. The controlled deflection roll as defined in claim 1, wherein:
    said base body contains a substantially helical-shaped flat groove extending between opposed ends of said base body for enabling distribution of said pressurised fluid medium between said sealing means and lengthwise of portions of said inner and outer surfaces of said sleeve member and said base body located between said sealing means.

9. The controlled deflection roll as defined in claim 8, wherein:
    said helical-shaped flat groove has a central portion possessing a first predetermined radius and at both sides of said groove rounded portions having a second predetermined radius; and
    said second predetermined radius of said rounded portions being smaller than said first predetermined radius of said central portion.

10. The controlled deflection roll as defined in claim 9, wherein:
    said first predetermined radius amounts to about 20 millimeters, the second predetermined radius amounts to about 5 millimeters, and the depth of said groove to about 0.7 millimeters.

* * * * *